June 8, 1943.  A. B. SCHULTZ ET AL  2,321,255
MARINE TRANSMISSION
Filed Dec. 19, 1941  3 Sheets-Sheet 1

INVENTORS
Arthur B. Schultz
Theodore R. Bush
BY
Edwin J. Balluff
Attorney

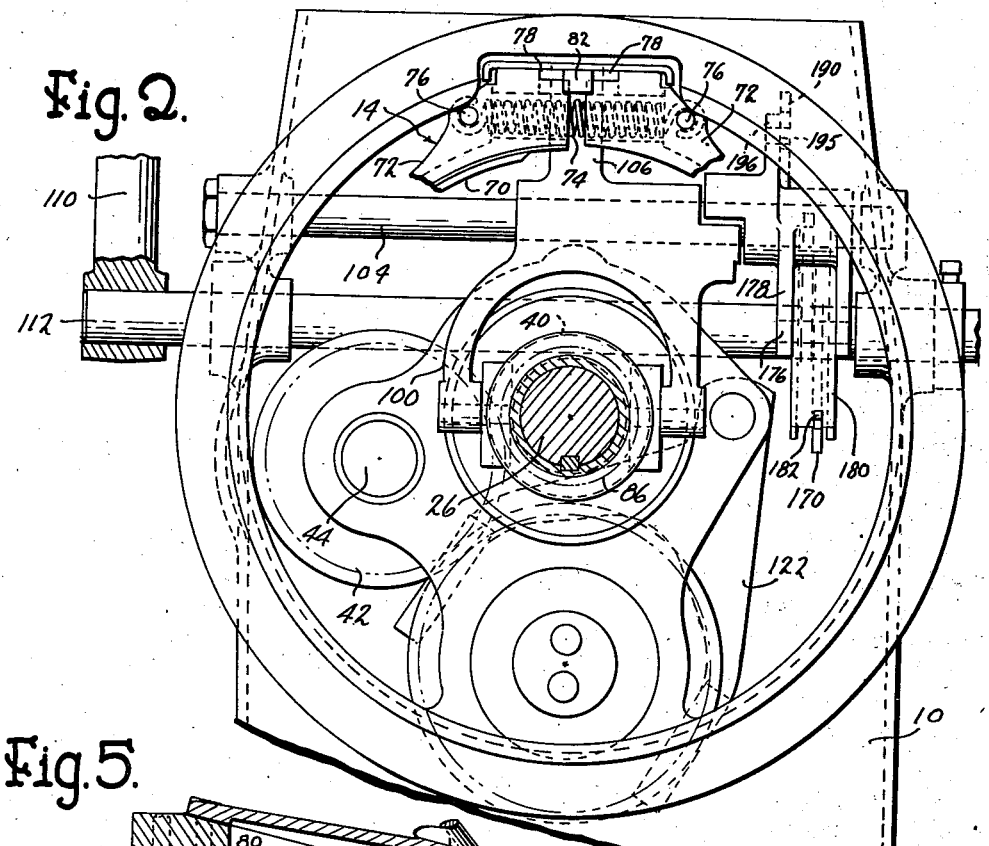
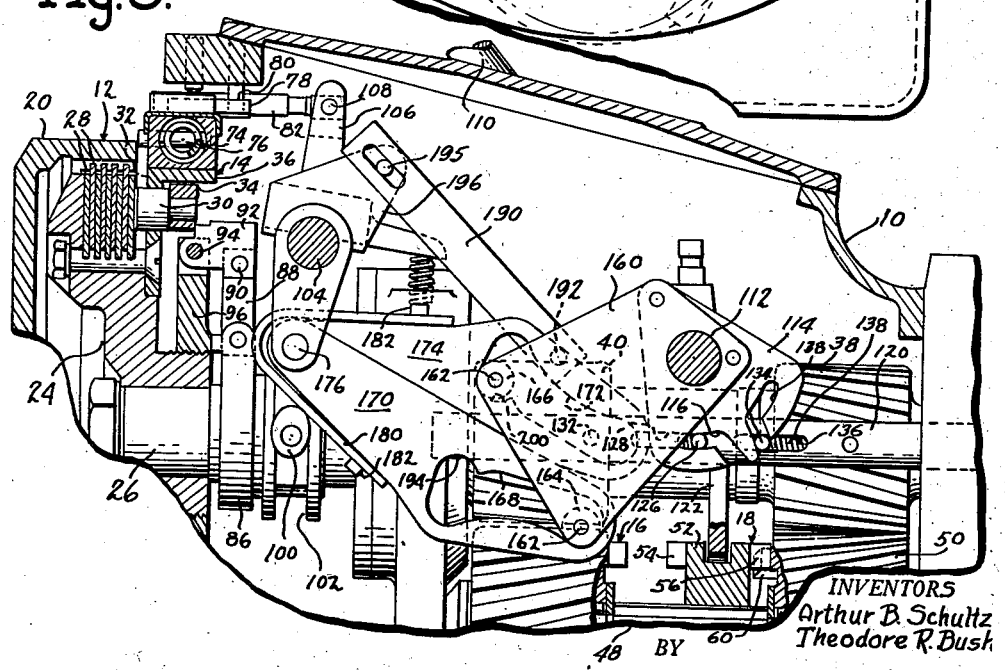

June 8, 1943.  A. B. SCHULTZ ET AL  2,321,255
MARINE TRANSMISSION
Filed Dec. 19, 1941  3 Sheets-Sheet 3

INVENTORS
Arthur B. Schultz
Theodore R. Bush
BY
Edwin J. Balluff
Attorney

Patented June 8, 1943

2,321,255

UNITED STATES PATENT OFFICE 2,321,255

MARINE TRANSMISSION

Arthur B. Schultz, Berkeley, and Theodore R. Bush, Royal Oak, Mich., assignors to Kermath Manufacturing Company, Detroit, Mich., a corporation of Michigan Application December 19, 1941, Serial No. 423,660

5 Claims. (Cl. 192—3.5)

This invention relates to reverse gears or power transmissions for marine use.

Principal objects of the invention are:

To provide an improved form of marine reverse gear;

To provide an improved shifting or control mechanism for a reverse gear;

To provide a control mechanism for a reverse gear which will facilitate shifting from neutral into either forward or reverse;

To provide a reverse gear and shifting mechanism therefor which will facilitate maneuvering of the boat in which the gear is arranged;

To provide a simple and dependable control mechanism for a reverse gear which is designed to release the transmission brake substantially simultaneously with engagement of the main clutch and which will permit shifting of the shift lever from neutral into either forward or reverse gear position even though the clutch teeth may abut.

Other objects and advantages of the invention will be apparent from a consideration of the following specification taken in conjunction with the accompanying drawings, of which there are three sheets and wherein:

Fig. 2 is a transverse sectional view taken along the line 2—2 of Fig. 1, looking in the direction of the arrows, with certain parts broken away;

Fig. 5 is a view similar to Fig. 1 but with the parts thereof arranged in forward drive position.

Figure 1:
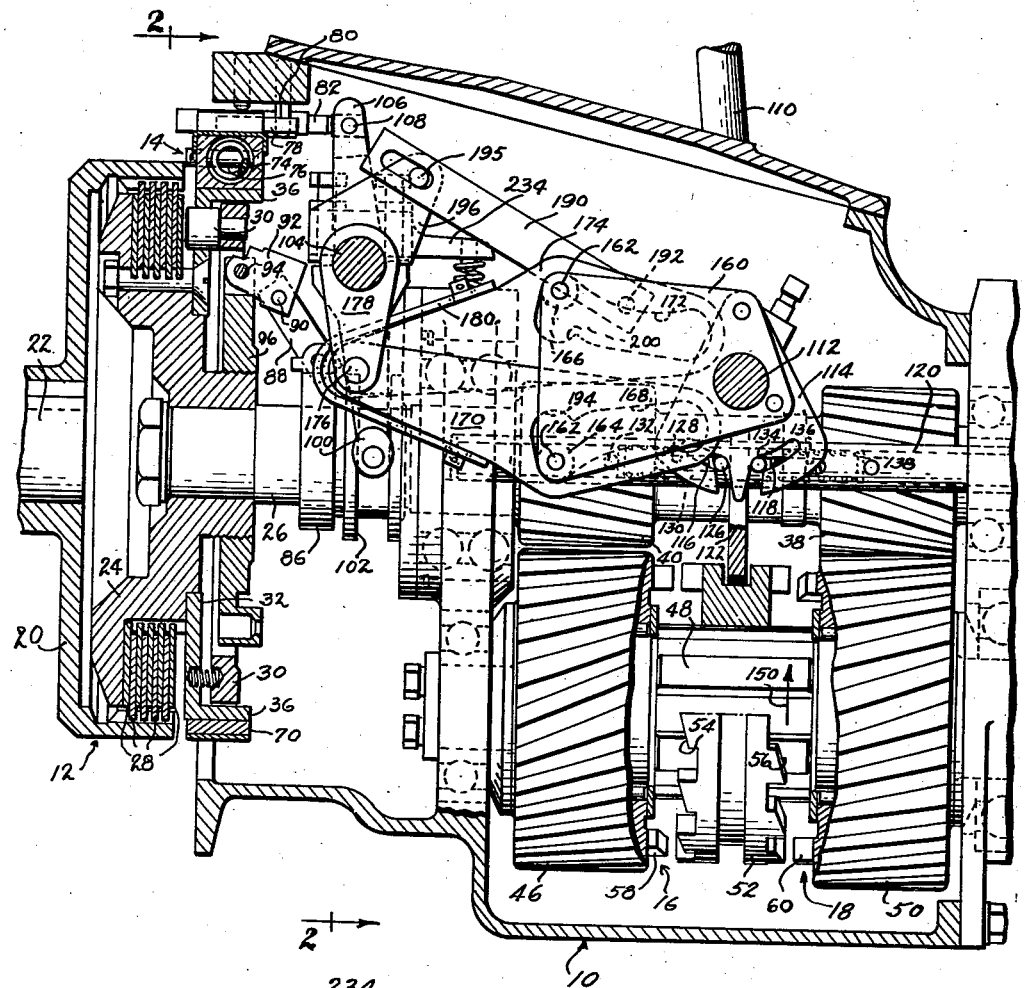
Fig. 1 is a fragmentary side elevational view of the transmission or reverse gear with certain parts thereof broken away and other parts being shown in section and with the transmission arranged in its neutral position.
Figure 3:
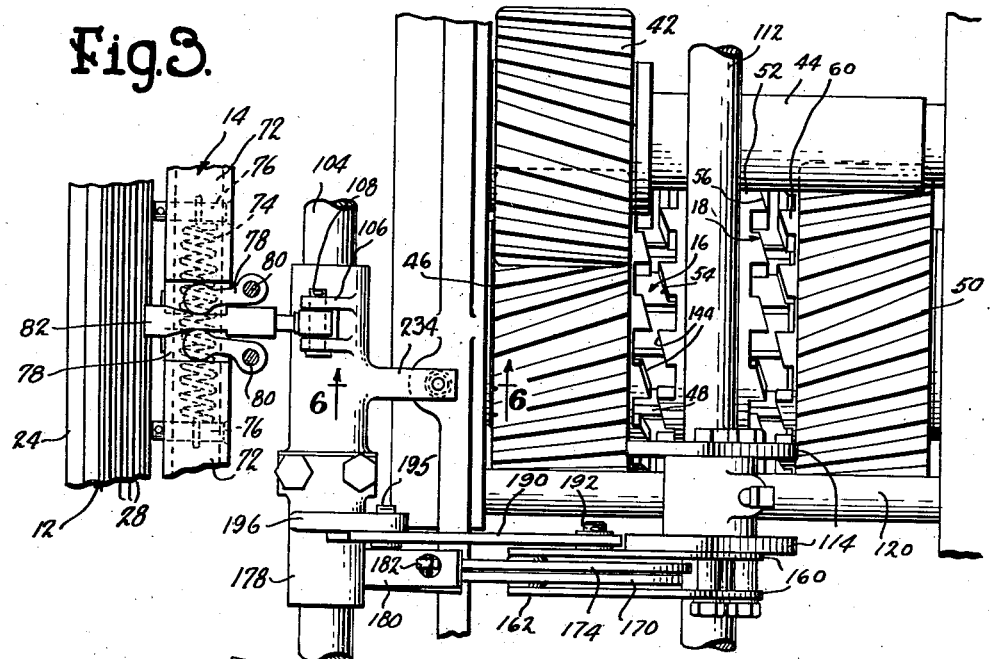
Fig. 3 is a plan view of the operating parts of the reverse gear with certain parts broken away and as they would appear with the upper part of the transmission case and the main shaft removed.

As illustrated in the embodiment of the invention selected for purposes of illustration, a reverse gear embodying the invention, referring now particularly to Figs. 1, 2 and 3, consists in general of a housing or case 10 in which the operating parts of the mechanism are arranged and supported, a main clutch 12, a brake 14, and positive clutches 16 and 18. The driving member 20 of the main clutch 12 may be driven by and mounted upon one end of a power shaft 22 such as the crank shaft of an engine. The driven part 24 of the main clutch 12 is fixed to rotate with the main or driving shaft 26 of the transmission which is axially aligned with the shaft 22 and journaled in suitable bearings provided in the transmission case 10. The clutch members 20 and 24 are each provided with clutch disks 28 arranged as illustrated in Fig. 1 and adapted when pressed together by the pressure pins 30 of the clutch 12 to establish a drive from the shaft 22 through clutch member 20, disks 28, clutch member 24 to the main shaft 26. A series of pins 30 are axially slidably mounted in holes formed in a plate 32 affixed to the driven clutch member 24 to rotate therewith. The pins 30 are carried by a pressure plate 34 which is slidable within the annular flange 36 formed on the periphery of the plate 32.

The main shaft 26 has provided thereon gears 38 and 40. The gear 40 is in constant mesh with the countershaft gear 42 which is journaled on a stationary shaft 44 supported by the transmission case 10 and arranged parallel to and in spaced relation with the main shaft 26. The countershaft gear 42 is in constant mesh with a reverse gear 46 journaled on the driven shaft 48 which in turn is journaled in bearings provided in the transmission case 10. The shaft 48 is arranged parallel to and spaced from the axis of the main shaft 26. The driven shaft 48 is the output shaft of the transmission and projects outside of the case 10 (to the right in Fig. 1) where it may be provided with a coupling member or gear of a V-drive for transmitting power to the propeller shaft and propeller of the vessel.

The teeth of the gear 38 are in constant mesh with the teeth of a forward gear 50 which is journaled on the shaft 48. A clutch member 52 is slidably splined to the shaft 48 between the gears 46 and 50 and is provided with lugs or teeth 54 and 56 which form parts of the clutches 16 and 18 respectively. The gear 46 is provided with axially projecting teeth 58 adapted to be coupled with the teeth 54 and which forms a clutch 16 and which is adapted to provide a positive drive between the reverse gear 46 and the driven shaft 48 when the clutch member 52 is shifted to the left, looking at Fig. 1. The gear 50 is provided with teeth 60 adapted to be coupled with the teeth 56 of the clutch member 52 to provide a positive drive between the forward gear 50 and the shaft 48 when the clutch member 52 is shifted to the right (Fig. 1). When the teeth 56 and 60 which comprise the clutch 18 are coupled the transmission will be set to provide a forward drive for the propeller, whereas when the teeth 58 and 54, which comprises the clutch 16, are coupled the transmission will be set to provide a reverse drive for the propeller.

The brake 14 comprises a friction band 70 arranged externally of the flange 36 of the plate 32, the ends of the band being anchored to members 72 which are biased toward each other for applying the brake by a spring 74, the ends of which are secured to pins 76 carried by the members 72. The members 72 are held apart by levers 78 pivoted at 80, the free ends of the levers 78 bearing against suitably oppositely disposed surfaces formed on the members 72. A shiftable bar 82 formed in the shape of a wedge and disposed between the ends of the members 78 is adapted to be moved to the right, looking at Fig. 3, to separate the members 72 and effect the release of the brake 14. In the position in which the parts of the brake are illustrated in Figs. 1 and 3, the brake is engaged due to the action of the spring 74. Suitable means, not shown, are provided to hold the band 70 and members from rotating with drum 36.

Figure 4:
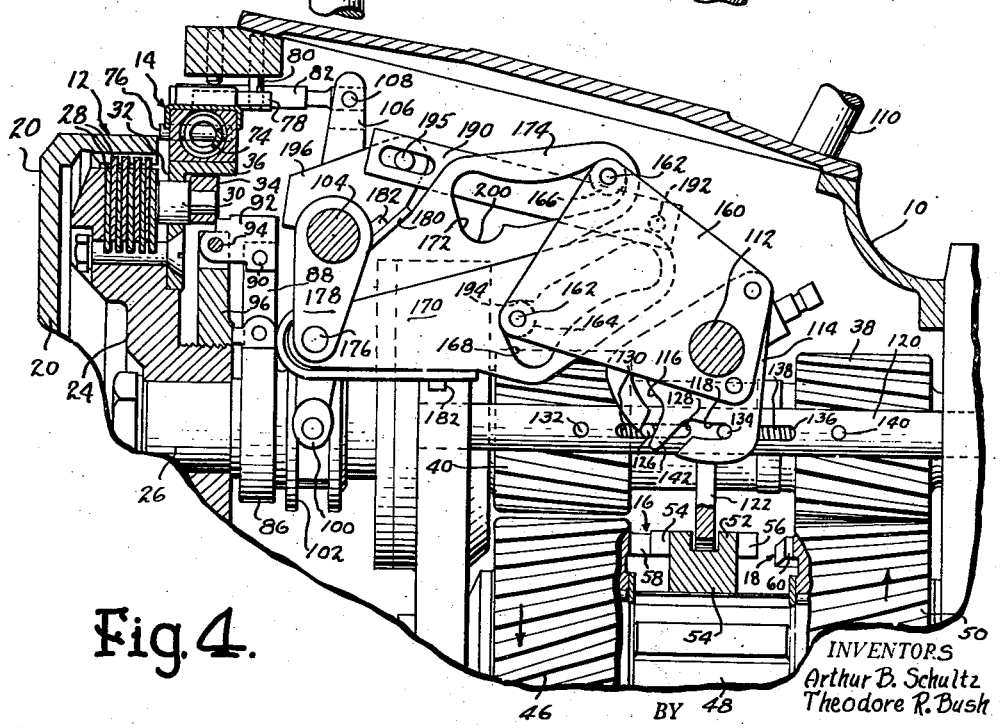
Fig. 4 is a fragmentary view similar to Fig. 1 but illustrating the relationship of the parts with the shift lever in reverse position and with the teeth of the positive clutch abutting.

The clutch 12 is released in the position in which the parts are illustrated in Figs. 1, 2 and 3. A collar 86 slidably keyed on the main shaft 26 between the clutch member 24 and a bearing for the shaft 26 is adapted to be shifted from the position in which it is illustrated in Fig. 1 to the position in which it is illustrated in Fig. 4 to effect the engagement of the clutch 12. The collar 86 has pivotally connected to it a series of links 88, each of which is pivotally connected at 90 to a member 92 pivotally mounted at 94 on a disk 96 carried by and rotatable with the clutch member 24. Each of the members 92 has a shoulder which is adapted to engage the edge of the clutch pressure plate 34 for shifting the same to the left, looking at Fig. 1, so as to clamp the clutch disks 28 together for the purpose of engaging the clutch 12. Only one of the links 88 and members 92 are illustrated in the drawings but several, preferably three or four, are used. The clutch collar 86 is adapted to be shifted by a fork 100 which runs in a groove 102 formed on the collar 86. The fork 100 is fixed to a rockable shaft 104 which is suitably journaled in the side walls of the transmission case 10. The fork 100 is formed integrally with a bifurcated arm 106 which has a pivotal connection at 108 to the end of the brake releasing member 82. The shaft 104 is adapted to be rocked as hereinafter described and when the parts of the transmission are shifted from the position in which they are illustrated in Fig. 1 to the positions in which they are illustrated in Figs. 4 or 5, the fork 100 and arm 106 are adapted to engage the clutch 12 simultaneously with the release of the brake 14 and vice versa.

The shiftable parts of the transmission are adapted to be actuated or shifted by a shift lever 110 which is fixed to a part of a rock shaft 112 which projects out of the transmisison case 10. The shaft 112 is journaled in suitable bearings in the walls of the transmission case. Within the case the shaft 112 has fixed to it a pair of spaced triangular shaped plates 114, each of which is provided with aligned slots 116 and 118. The plates 114 straddle a shift rail 120 which carries the fork 122, the fork 122 running in a groove of the clutch member 52 and being adapted to shift the same between its various positions. The fork 122 is provided with a hub 124 which is fastened to the rail 120. The ends of the rail are slidably mounted in suitable bores formed in the walls of the transmission case. A lost motion connection is provided between the plates 114 and the shift rail 120 and comprises a pin 126 extending through a transverse slot 128 formed in the rail 120. The pin 126 projects from each side of the rail 120 and has its ends arranged in the grooves 116 provided in the plates 114. The interior of the rail may be hollow and a spring 130 is confined between the movable pin 126 and a stationary pin 132 extending through the rail 120. When the transmission is in neutral the pin 126 is held in the right hand end of slot 128 by the spring 130 and is normally arranged at the bend in the slots 116 as illustrated in Fig. 1. Another pin 134 extending transversely through a slot 136 formed in the rail 120 and projecting into the slots 118 in the members 114 is normally confined in the left hand end of the slot 136 by a spring 138 arranged within the rail 120 between the pin 134 and the stationary pin 140. Thus when the shift lever 110 is shifted from its neutral position to its reverse position, for example as illustrated in Fig. 4, the triangular shaped members 114 act on the pin 126 which in turn acts on the spring 130 and the shift rail 120, the shift fork 122 and the clutch member 54.

The tongue 142 which forms a part of the slots 116 and 118 will move in a clockwise direction about the axis of the shaft 112 and shift the clutch member from its neutral position, as illustrated in Fig. 1, to a position in which the clutch member 54 is illustrated in Fig. 4. In the position in which the teeth of the clutch 16 are illustrated in Fig. 4, the beveled ends or faces 144 of the teeth 54 and 58 are abutting, thereby preventing the coupling of the teeth which is necessary to provide the drive between the gear 46 and the shaft 48. The spring 130, however, is compressed by the movement of the shift lever 110 to its reverse position, thereby creating a force which will shift the clutch member 54 to couple the teeth of the clutch 16 when they are properly lined up which will occur as soon as the main clutch 12 is engaged. In the position in which the clutch member 54 is illustrated in Fig. 1, the main clutch 12 is disengaged and the brake 14 is applied so that if the boat is not moving the shaft 48 will be stationary. However, if the boat is drifting forwardly, the shaft 48 will turn in the direction indicated by the arrow 150 in Fig. 1, and if the boat is drifting rearwardly, the shaft 48 will turn in the opposite direction.

If the teeth 54 and 58 abut when there is no relative rotation between the gear 46 and the shaft 48 when the shift lever 110 is shifted from neutral to reverse position as previously described, the clutch member 54 will be stopped in its movement in the position illustrated in Fig. 4. However, the control mechanism for engaging the clutch 12 and disengaging the brake 14 is connected so that when the member 54 reaches approximately the position illustrated in Fig. 4, the main clutch 12 will begin to engage and the brake 14 will begin to release, thereby driving the gear 46 in the direction indicated by the arrow in Fig. 4. As soon as the gear 46 begins to move, assuming that the clutch member 54 is stationary, the bevel 144 on the teeth will permit the teeth 54 and 58 to slide into complete engagement under the influence of the spring 138 which, acting on the pin 132, will cause the shift rail to move to the left and bring the right hand end of the slot 128 up against the pin 126.

When the shift lever 110 is restored to neutral, the part of the member 114 which defines the slot 116 will engage the pin 126 and shift the same from the position illustrated in Fig. 4 to the position illustrated in Fig. 1, thereby restoring the shift rail 120 and clutch member 54 to neutral position. When the shift lever 110 is shifted from neutral to reverse, the pin 126 will move from the bend in the slot 116 toward the open end of the slot while the pin 134 will move toward the closed end of the slot 118. When the shift lever 110 is restored to neutral from reverse, and as the pin 126 is in the path of movement of the member 114, the pin 126 will be positively moved to the right and as soon as the pin 126 moves against the right hand end of the slot 128 the shift rail 120 will be positively returned to its neutral position. Of course, if the teeth 54 and 56 should be properly aligned when the shift lever is shifted into reverse from neutral, then the clutch member 54 will be shifted all the way to its leftmost position.

The action of the lost motion connection when the shift lever is shifted from neutral to forward position is the same as that just described, except that in this case member 114 will shift from the position illustrated in Fig. 1 to the position illustrated in Fig. 5 and the shifting will take place due to the co-actiton between the pin 134, the member 114, the slot 118 therein, the slot 136 in the rail 120, and the spring 138. The clutch member 54 is illustrated in position with the clutch 18 fully engaged in Fig. 5 so as to provide a forward drive for the vessel.

From the foregoing it will be seen that a lost motion connection is provided between the clutch member 54 and the shift lever 110 so that if the teeth of the clutches 16 or 18 abut when the shift lever is shifted from neutral into either forward or reverse, the shift lever at one time may be shifted through to forward or reverse positions and the clutches 16 or 18 will engage as soon as relative rotation between the teeth thereof occurs which happens when the main clutch 12 is engaged and the brake 14 is released, as will now be described.

There is fixedly secured to one of the triangular plates 114 a pair of spaced plates 160 forming part of a toggle mechanism. The plates 160 are joined together by pins 162 at two of the corners thereof and the pins provide a support for sleeves or rollers 164 and 166. The roller 164 is arranged in a slot 168 provided in a link 170 and the roller 166 is arranged in a slot 172 formed in link 174. The links 170 and 174 are pivoted on a shaft 176 carried by the arms of a fork 178 fixed to the shaft 104 to move therewith. The links 170 and 174 are arranged between the arms of the fork 178 and are biased together by a leaf spring 180 which bears against the upper side of the link 174 and the lower side of the link 170. The pins 182 extend through suitable openings formed in the spring 180 so as to keep the same in position. A link 190 pivotally connected at 192 to one of the plates 160 has a slot connection with a pin 195 carried by an arm 196 formed on the fork 178.

With the parts arranged as illustrated in Fig. 1, the spring 180 holds the links 170 and 174 together with the rollers 164 and 166 at the bends in the slots 172 and 168. When the shift lever 110 is shifted from neutral to reverse the roller 164 carried by the plates 160 moves into the dwell 194 in the slot 168 while the roller 166 acting against the link 174 moves to the opposite end of the slot 172.

The initial movement of the plate 160 in a clockwise direction with the shaft 112 will move the right hand end of the slot in the link 190 up against the pin 195 in the link 196, the roller 164 into the dwell 194, and will cause the roller 166 to move in the slot 172 and open the links 170, 174 against the action of the spring 180.

The initial movement of the shift lever 110 from neutral to reverse will move the clutch member 54 from the position illustrated in Fig. 1 to the position illustrated in Fig. 4. The distance from the center of the shaft 112 to the center of the pivot 176 is less than the sum of the distance from the center of the shaft 112 to the center of the roller 164 plus the distance from the center of the roller 164 to the center of the pivot 176 so that as the roller 164 moves with the plate 160 in a clockwise direction the roller 164 will react against the wall of the slot 168 and cause the link 170 to shift the pivot 176 and fork 178 to which it is connected in a clockwise direction. This movement of the fork 178 will shift the clutch collar from its neutral position to that illustrated in Fig. 4 to engage the clutch and will simultaneously move the brake arm 106 in a clockwise direction for the purpose of releasing the brake 14.

In shifting from reverse back to neutral, the parts will return to the position illustrated in Fig. 1 and the right hand end of the slot in the link 190 will move against the pin 195 and thereby positively move the arm 196 in a counterclockwise direction, thereby positively moving the clutch collar 86 to its disengaged position and the member 82 of the brake to its disengaged position.

In shifting from neutral to reverse, the rollers 164 and 166 will spread the links 170 and 174 farther than they are spread in Fig. 4 so that the spring 180 acting on the links 170 and 174 and the rollers 164 and 166 will function as detents for holding the parts of the transmission in a reverse position.

In shifting from reverse back to neutral, the brake 14 will be applied simultaneously with the disengagement of the clutch so as to break the drive through the transmission, thereby taking the load off the teeth of the clutch 16, and after this has happened the clutch member 54 will be shifted to disengage the clutch 16.

When the transmission is shifted from neutral to forward position, which is illustrated in Fig. 5, the plates 160, rollers 164 and 166, and the links 170 and 174 will cooperate in a manner similar to that previously described in connection with the action on shifting from neutral to reverse, except that when the shift is made to forward, the plates 160 will move in a counterclockwise direction and the roller 166 will seat in the dwell 200 of the slot 172 whereas the roller 164 will move into the opposite end of the slot 168. The initial movement of the shift lever 110 from neutral into forward will shift the clutch member 54 to a position where the teeth of the clutch 18 will abut if they are not in line, and thereafter further movement of the shift lever 110 toward the forward position will release the brake 14 simultaneously with the engagement of the clutch 12 and engage the teeth of clutch 18 if lined up.

Figure 6:
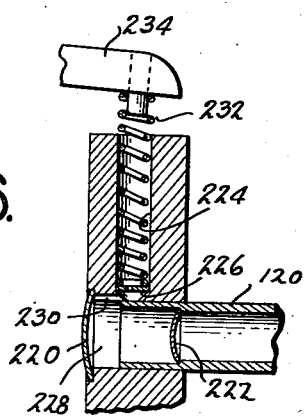
Fig. 6 is a sectional view taken along the line 6—6 of Fig. 3, looking in the direction of the arrows.

In Fig. 6 there is illustrated a dash pot which functions to slow down movement of the shift rail 120. The end of the rail is journaled in a bore in the wall of the transmission case, the bore being closed by a plug 220 and the interior of the rail 120 being closed by a plug 222. The space between the plugs 220 and 222 is filled with oil and supplied from a source such as a reservoir 224 arranged above the rail 120. A metering plug 226 is fitted in the bottom of the oil reservoir 224 and restricts the flow of oil from the reservoir 224 to the chamber 228 provided by the bore in which the rail 120 is slidable. The rail 120 is shown in its neutral position. When it moves from such position to its reverse position, it will move to the left and consequently must force the oil from the chamber 228 through the metering plug 226 into the reservoir 224. A similar dash pot is provided on the other end of the rail 120 for checking its movement to the right. A groove 230 communicating with the chamber 228 and with the reservoir 224 below the plug 226 conducts oil therebetween. The reservoir 224 may form a seat for a spring 232 which acts on the shaft in such a manner so as to aid in shifting the clutch collar 86 back to its disengaged position and to aid in releasing the brake 14.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

We claim:

1. In a marine power transmission system, driving means and driving and driven shafts, a main clutch engageable and disengageable for controlling the drive between said means and said driving shaft, gearing including a toothed clutch and operable for establishing a driving connection between said driving and driven shafts, said clutches comprising shiftable clutch members having released and engaged positions and mechanism for controlling said clutches comprising a shift lever, connections between said shift lever and said clutch members for shifting the latter upon movement of the former and so as to move said clutch member of said toothed clutch to engage the teeth thereof before said clutch member of said main clutch is moved sufficiently to engage the same, said connection between said shift lever and said toothed clutch including a lost motion connection which will permit continued movement of said shift lever and the engagement of said main clutch if the teeth of said toothed clutch are misaligned upon shifting of said shift lever to set up a drive between said driving means and said driven shaft, said lost motion connection comprising a shift rail having a stop thereon, a pin carried by said rail, a spring operatively arranged between said pin and said stop, a lever adapted to be actuated by said shift lever and having a slot therein into which said pin extends, one wall of said slot functioning, upon movement of said shift lever to set up a drive, to move said pin for the purpose of shifting said rail in one direction through force transmitted through said spring, and another wall of said slot functioning, upon movement of said shift lever to break the drive, to positively move said pin and shift rail in the opposite direction, and a fork carried by said rail and connected with said clutch member of said toothed clutch for shifting the same into and out of engaged position.

2. In a marine power transmission system, driving and driven shafts, gearing including a toothed clutch operable for establishing a driving connection between said shafts, said clutch comprising a shiftable clutch member having released and engaged positions, and mechanism for controlling said clutch comprising a shift lever, a connection between said shift lever and said clutch member for shifting the latter upon movement of the former and so as to move said clutch member to engage the teeth of said clutch, said connection between said shift lever and said toothed clutch member including a lost motion connection which will permit continued movement of said shift lever to clutch engaged position thereof if the teeth of said clutch are misaligned upon shifting of said shift lever to set up a drive between said driving and driven shafts, said lost motion connection providing positive disengagement of said clutch upon restoring said shift lever to neutral position, said lost motion connection comprising a shift rail having a stop thereon, a pin carried by said rail, a spring operatively arranged between said pin and said stop, a lever adapted to be actuated by said shift lever and having a slot therein into which said pin extends, one wall of said slot functioning, upon movement of said shift lever to set up a drive, to move said pin for the purpose of shifting said rail in one direction through force transmitted through said spring, and another wall of said slot functioning, upon movement of said shift lever to break the drive, to positively move said pin and shift rail in the opposite direction, and a fork carried by said rail and connected with said clutch member of said clutch for shifting the same into and out of engaged position.

3. In a marine power transmission system, driving means and driving and driven shafts, a main clutch engageable and disengageable for controlling the drive between said means and said driving shaft, gearing including a toothed clutch and operable for establishing a driving connection between said driving and driven shafts, said clutches comprising shiftable clutch members having released and engaged positions and mechanism for controlling said clutches comprising a manual shift lever, connections between said shift lever and said clutch members for shifting the latter upon movement of the former and so as to move said clutch member of said toothed clutch to engage the teeth thereof before said clutch member of said main clutch is moved sufficiently to engage the same, said connection between said shift lever and said toothed clutch including a lost motion connection which will permit continued movement of said shift lever and the engagement of said main clutch if the teeth of said toothed clutch are misaligned upon shifting of said shift lever to set up a drive between said driving means and said driven shaft, said lost motion connection comprising a shift rail having a stop thereon, a pin carried by said rail, a spring operatively arranged between said pin and said stop, a lever adapted to be actuated by said shift lever and having a slot therein into which said pin extends, one wall of said slot functioning, upon movement of said shift lever to set up a drive, to move said pin for the purpose of shifting said rail in one direction through force transmitted through said spring, and another wall of said slot functioning, upon movement of said shift lever to break the drive, to positively move said pin and shift rail in the opposite direction, and a fork carried by said rail and connected with said clutch member of said toothed clutch for shifting the same into and out of engaged position, said connection between said shift lever and said main clutch comprising a toggle joint which also functions as a detent for holding said shiftable clutch members and said shift lever in either released or engaged position of the clutches.

4. In a marine power transmission system having a clutch which is engageable and disengageable for controlling the drive between the input and output shafts of the transmission, said clutch comprising a shiftable clutch member having released and engaged positions, a mechanism for controlling said clutch comprising a shift lever, a connection between said shift lever and said clutch member for shifting the latter upon movement of the former so as to move said clutch member to engage and release the clutch, said connection comprising a toggle mechanism which includes a pair of links having a pivotal connection with each other at one end thereof, a pivoted arm connected to said pivotal connection and adapted to shift said clutch member, each of said links being provided with a slot, a spring urging said links together, an actuating link having pins, one for and extending into each of said slots, said actuating link being mounted upon a rock shaft which has a neutral position and a clutch engaged position on each side of said neutral position, and means for rocking said shaft from its neutral position to either of the clutch engaged positions so as to actuate said toggle for engaging said clutch.

5. A marine power transmission comprising driving and driven members, means including a clutch operable for establishing a drive between said members and including a shiftable part operable for engaging and disengaging said clutch, a shift lever operable for shifting said part between clutch engaged and disengaged positions, a shaft upon which said shift lever is mounted, a fork connected with said part for shifting the same, a toggle between said shaft and said fork comprising an actuating link fixed to rock with said shaft in a plane normal to the axis thereof, a pair of links pivotally connected together at one end thereof and connected with said fork for shifting the same, each of said links of said pair having a pin and slot connection with said actuating link, a spring biasing said links of said pair together, said toggle being operable when the shiftable part of said clutch is in clutch disengaged position and upon movement of said shift lever in either direction for shifting said part into clutch engaged position for engaging said clutch.

ARTHUR B. SCHULTZ.
THEODORE R. BUSH.